Figure 1:
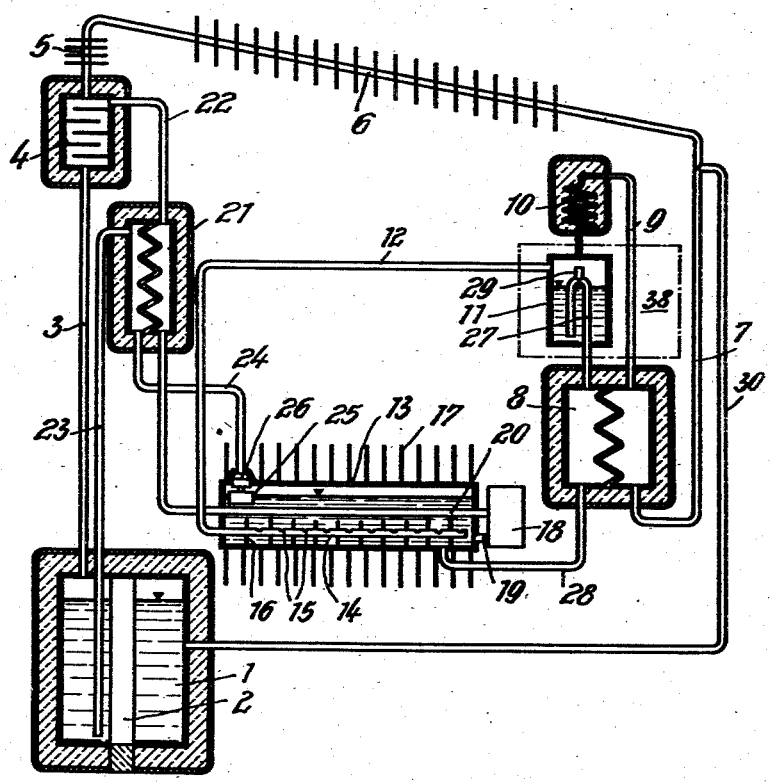

Nov. 12, 1940.  K. NESSELMANN ET AL  2,221,551
ABSORPTION REFRIGERATING APPARATUS
Filed Aug. 17, 1938  2 Sheets-Sheet 1

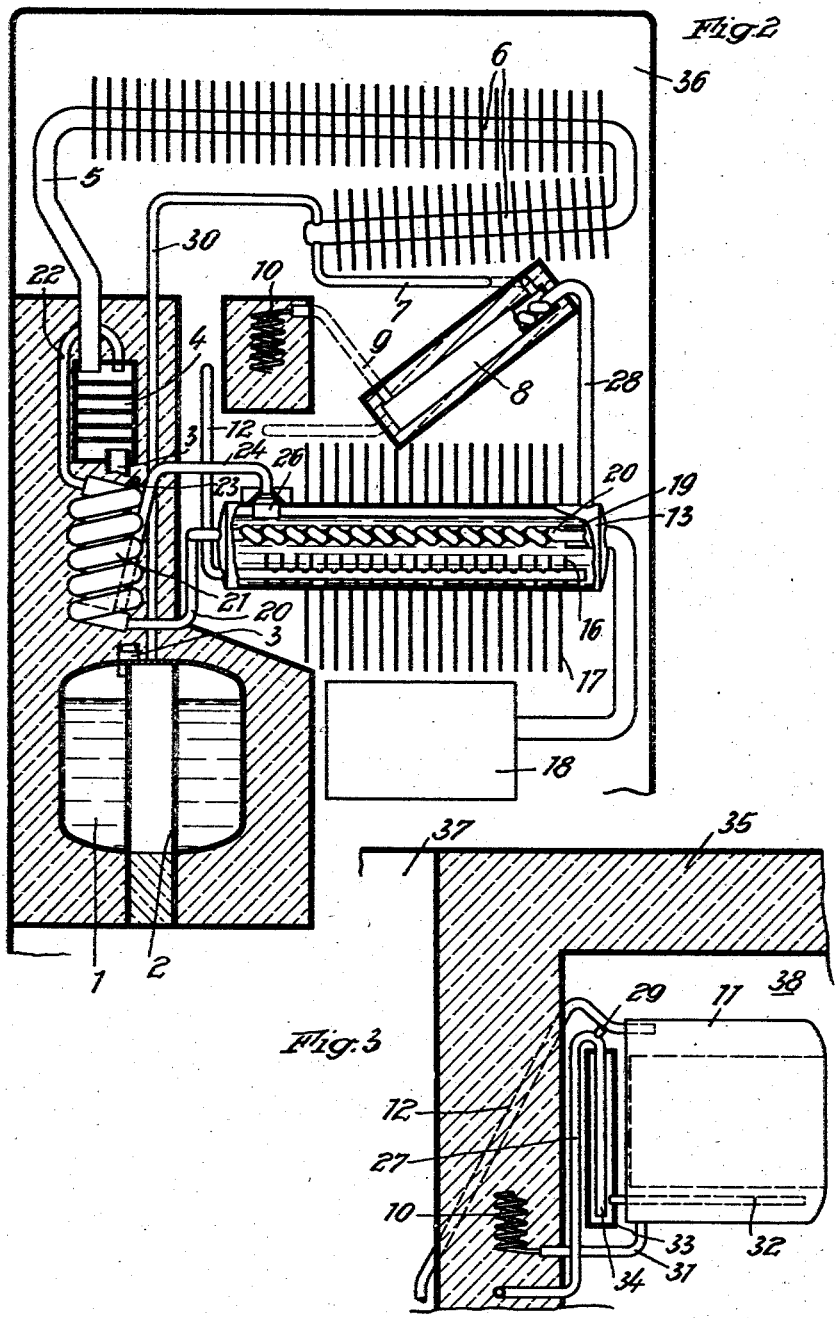

Patented Nov. 12, 1940

2,221,551

UNITED STATES PATENT OFFICE 2,221,551

ABSORPTION REFRIGERATING APPARATUS

Kurt Nesselmann and Ernst Sprengel, Berlin-Siemensstadt, Germany, assignors to Patent-verwertungs-Gesellschaft mit beschränkter Haftung "Hermes," Berlin, Germany, a corporation of Germany Application August 17, 1938, Serial No. 225,292
In Germany August 17, 1937

4 Claims. (Cl. 62—119)

The present invention relates to absorption refrigerating apparatus of the continuous type in which the difference in pressure between the generator and condenser on the one hand and the evaporator and absorber on the other hand is maintained by two throttles inserted in the circuit of the operating medium. According to the invention the volume of the generator in such an apparatus is chosen so much greater than the volume of the absorber, evaporator, supply conduits and the like that even when the absorber, the evaporator and the supply conduits are completely filled up with liquid enough solution is still left in the generator to prevent a dangerous rise in temperature of the heating surface. In this manner absorption refrigerating apparatus of the above-indicated character are fully protected against all dangers which may be due to the failure of valves and pumps, the latter serving in such apparatus in most cases to supply the solution from the absorber to the generator. Even if, for instance, the pump for circulating the solution fails to operate for any reason dangerous overheating of the heating surface cannot occur when dimensioning the apparatus according to the invention, since care is taken to have always a sufficiently large amount of solution in the absorber. When carrying the invention into practice a return conduit is, for instance, in communication with the condenser and through which returns always an amount of solution to the generator, after the absorber, the evaporator and the supply conduits are filled up completely, that undue pressures and an undue temperature stress of the heating surface are prevented. Absorption refrigerating apparatus of the continuous type according to the invention are preferably employed in domestic refrigerators.

According to the invention the excess quantities of operating liquid which have not been converted into vapor return from the evaporator to the absorber through an ascending return pipe whose opening lies in the lower part of the evaporator and is designed in the form of an overflow in such a manner that a given height of the refrigerant level is maintained within the evaporator. In this case the inlet for the liquid refrigerant and the outlet for the solution flowing into the absorber are preferably arranged at different points lying as far apart as possible. By the use of the ascending tube the relatively weak solution may pass from the evaporator into the return pipe. In order to prevent the ascending pipe to act as a siphon the upper end thereof is connected above the liquid level to the evaporator chamber. If a flow of the vaporous refrigerant takes place through the pressure compensation tube the operation of the apparatus is not impaired thereby, since this refrigerant has already produced refrigeration by its evaporation and also reaches the absorber together with the excess quantities of operating liquid.

The liquid refrigerant coming from the condenser may be cooled in the usual manner below the point of liquefaction by means of a heat exchanger which is arranged between the condenser-evaporator on the one hand and evaporator-absorber on the other hand. It is particularly advantageous in an apparatus provided with a return pipe of the above-mentioned character to effect the cooling below the temperature of condensation of the liquid refrigerant in a heat exchanger in which the liquid refrigerant is brought into heat exchange with the liquid flowing from the evaporator into the absorber through the return pipe.

To attain a particularly effective absorption a horizontal absorber is preferably employed in which the evaporated refrigerant passes through a conduit extending substantially throughout the entire length of the absorber and having a plurality of outlet openings arranged side by side. According to the invention transverse ribs are arranged in the absorber so as to result in zones of different concentrations and of different temperatures. The concentrated solution is caused to circulate through a heat exchanger which brings this solution into heat exchange with the zones arranged in the absorber. In this manner the heat exchange is more effective owing to the greater difference in temperature between the rich solution returning to the generator and the weak solution entering the absorber.

In the accompanying drawings is shown an embodiment of the invention in diagrammatic form, in which Fig. 1 represents a diagrammatic layout of an absorption system of the continuous type embodying the present invention.

Fig. 2 represents semi-diagrammatically and in sectional elevation the embodiment of the invention in a domestic refrigerator, and Fig. 3 represents in horizontal section the arrangement of the evaporator in the refrigerating chamber of the refrigerator, Fig. 2.

Referring to Fig. 1, the refrigerant is expelled from the absorption solution, contained in the generator 1 and enriched with the refrigerant, by heating it with the aid of the heating element 2. The vaporous refrigerant passes through a conduit 3 into a rectifier 4 and then into the air-cooled condenser 6 through the water-separator 5 provided with cooling ribs. The liquefied refrigerant then passes from the condenser 6 into the evaporator 11 by way of a conduit 7, heat exchanger 8, a conduit 9 and a fixed throttle 10, such as, for instance, a capillary tube, by means of which the high pressure of condensation is reduced to the low pressure of evaporation. The evaporator is arranged in a refrigerator chamber 38 shown in dotted lines. Owing to the absorption of heat from this chamber the liquid refrigerant evaporates in the evaporator 11. The vaporous refrigerant passes from the upper part of the evaporator through a conduit 12 into the absorber 13. The inlet tube 14 for the vaporous refrigerant is provided with a plurality of perforations 15 for the escape of the vapors and is so arranged in the absorber that the vapors of the refrigerant pass through the weak solution contained in the absorber. The absorber 13 is designed in the form of a horizontal cylindrical container. Inside the container are arranged vertical baffles 16 which are so dimensioned in height as to be short of the liquid level. In this manner zones of different concentrations and of different temperatures are obtained. The arrangement of the baffles shown has the advantage that these zones of different temperatures of absorption are more accurately separated with respect to each other than would otherwise be possible. The heat liberated during the absorption is directly carried off to the atmosphere by cooling ribs 17. The rich solution is forced from the absorber back into the generator 1 by means of a liquid circulating pump 18. The pump draws off the absorption liquid through a conduit 19 and forces it through a heat exchanger 21 by way of a conduit 20 extending through the absorber. The rich solution passes from heat exchanger 21 through a conduit 22 into the above-mentioned rectifier 4 from where it flows back into the generator 1 through the conduit 3 in counterflow to the vaporous refrigerant expelled from the generator.

The weak solution is carried off from the lower part of the generator 1 through a conduit 23 and passes at first into the heat exchanger 21 where it comes into heat exchange with the rich solution flowing from the absorber. The weak solution flows from the heat exchanger 21 through a conduit 24 to the absorber 13. At the inlet is provided a valve 26 operated by a float 25. By this valve the liquid level in the absorber is maintained constant and the high pressure in the generator is throttled to low pressure prevailing in the absorber.

In order to remove from the evaporator 11 the absorption solution entrained into the latter a U-shaped conduit 27 whose left limb is immersed in the liquid contained in the evaporator 11 is provided. Through this tube flows the liquid collected in the evaporator into the heat exchanger 8 and then back to the lower part of the absorber through a conduit 28. In the heat exchanger 8 the hot liquid refrigerant coming from the condenser through the conduit 7 exchanges heat with the liquid discharged from the evaporator. This special arrangement of the heat exchanger presents the following advantages. The evaporated refrigerant flows in a cold state into the absorber where it is heated, thus relieving the absorber insofar as the quantity of heat, to be carried off from the latter to the outside, is reduced by the amount of heat which serves to heat the incoming cold refrigerant to the end temperature of the absorber. A further advantage of the heat exchanger consists in that the relative large amounts of refrigerant which flow in an unevaporated state through the conduits 27, 28 into the absorber are evaporated by this heat exchanger. In this manner the condensate is cooled to such an extent below the temperature of condensation that when the condensate is throttled the losses are reduced by the pre-evaporation in the capillary tube 10.

The upper part of the U-shaped tube 27 is provided with a pressure compensation tube 29. The particular arrangement of the U-shaped tube 27 has the advantage that only the relatively weak solution passes from the evaporator into the return pipe. The tube 27 is so designed that a given height of the refrigerant level is automatically maintained in the evaporator.

To protect the apparatus against undue increases in pressure which may occur if the liquid flowing from the condenser 6 into the evaporator 11 fills up the heat exchanger 8 and the conduit 7, an overflow conduit 30 ending in the central portion of the generator 1 is connected to the conduit 7. As soon as the liquid level within the system rises above the overflow point at which conduit 30 is connected to conduit 7 the condensate flows automatically back into the generator.

Of the parts of the apparatus shown the generator 1, the rectifier 4, the heat exchanger 8 and the heat exchanger 21 for the solution are heat-insulated as will be seen from Fig. 1. The volume of the generator is chosen according to the invention so much greater than the total volume of the absorber and the evaporator that when the evaporator, absorber, auxiliary conduits etc. are completely filled up there remains enough solution in the generator to prevent dangerous pressures and a dangerous temperature stress of the heating surface. As to the relative position of the individual vessels shown in Fig. 1 the following may be pointed out:

The evaporator 11 must lie in the arrangement shown higher than the absorber in order to ensure a discharge of the excess quantities of unevaporated operating liquid. The condenser must be located higher than the generator whereas the generator and condenser may be located at any height with respect to the evaporator and absorber. Instead of the float-operated valve 26 shown in Fig. 1 also a capillary tube may be employed. The use of a float at this point is desirable, since in this case clogging is prevented. A capillary tube 10 must be employed in the apparatus shown in Fig. 1 in the condensate conduit extending from the condenser 6 to the evaporator 11, since otherwise starting of the apparatus would be difficult and a discharge of the excess quantities of the unevaporated operating liquid is thus ensured.

Figs. 2 and 3 show the arrangement of the refrigerating apparatus schematically represented in Fig. 1 disposed in a domestic refrigerator, the same numerals of reference denoting the same parts in all views. Fig. 2 shows a side elevation of the refrigerator 38 with the parts of the apparatus arranged in part in the insulation and located outside the cooling chamber 38 and Fig. 3 shows a horizontal sectional view of a refrigerator broken away, in the cooling chamber 38 of which is arranged the evaporator 11. The inner conduit of the heat exchanger 8 and the return conduit 20 for the weak solution arranged in the absorber are designed in the form of spiral-shaped conduits in order to attain a good heat exchange. The intake conduit and the discharge conduit of the solution pump 18 are combined to form a double conduit (i. e., one within the other) in the embodiment shown in Fig. 2. The liquid refrigerant coming from the capillary tube 10 passes through a conduit 31 (Fig. 3) into the left end of the cylinder-shaped evaporator. The ascending branch of tube 27 is here arranged in a closed tank 33 to the lower end of which is connected the discharge conduit 32 whose opening lies at a point as far apart as possible from the inlet for the condensate through conduit 31, thus ensuring a discharge of only the relatively weak solution from the evaporator. In Fig. 3, 36 denotes the chamber for the reception of the parts of the refrigerating apparatus lying outside the cooling chamber, shown in Fig. 2.

What is claimed is:

1. An absorption refrigerating apparatus of the continuous type comprising a generator, a condenser, an evaporator, a horizontal absorber and conduits between these parts, a throttle between said condenser and said evaporator, a second throttle between said absorber and said generator, both throttles serving to maintain the difference in pressure between generator and condenser on the one hand and evaporator and absorber on the other hand, the supply conduit from the evaporator to the absorber consisting of a tube provided with a plurality of inlet openings lying side by side and extending substantially throughout the length of the absorber and transverse baffles disposed between said inlet openings, said baffles extending upwardly short of the solution level so as to create zones of different concentration and different temperature, the conduit conveying the concentrated solution from the absorber to the generator extending through the length of said absorber past said several zones to bring the latter into heat exchange with said conduit.

2. An absorption refrigerating apparatus of the continuous type comprising a generator, a condenser, an evaporator, an absorber and conduits between these parts, a throttle between said condenser and said evaporator, a second throttle between said absorber and said generator, both throttles serving to maintain a given difference in pressure between the generator and condenser on the one hand and the evaporator and absorber on the other hand, the volume of said generator and the quantity of the absorption solution contained therein being sufficiently in excess of the volume of the absorber, the evaporator and the appertaining supply conduits, so that in case the absorber, the evaporator and the supply conduits should become completely filled with the absorption solution, enough solution still remains in the generator to prevent a dangerous temperature rise of the heating surface, and an overflow conduit connected at one end to said generator and at the other end to the condenser discharge conduit at a level with respect to the generator which, after filling of the absorber, the evaporator and their connecting conduits with liquid, permits sufficient operating medium to return to the generator to prevent increase in pressure therein and dangerous heating of its heating surface.

3. An absorption refrigerating apparatus of the continuous type comprising a generator, a condenser, an evaporator, an absorber and conduits between these parts, a throttle between said condenser and said evaporator, a second throttle between said absorber and said generator, both throttles serving to maintain a given difference in pressure between the generator and condenser on the one hand and the evaporator and absorber on the other hand, the volume of said generator and the quantity of the absorption solution contained therein being sufficiently in excess of the volume of the absorber, the evaporator and the appertaining supply conduits, so that in case the absorber, the evaporator and the supply conduits should become completely filled with the absorption solution, enough solution still remains in the generator to prevent a dangerous temperature rise of the heating surface, the conduit connecting said absorber with said evaporator extending with an inverted curve into said evaporator and terminating in the lower portion thereof to only drain the leanest portion of the refrigerant from the evaporator, the highest point of said curved conduit being connected with the evaporator space above the refrigerant level to maintain automatically a given overflow level of the evaporator.

4. An absorption refrigerating apparatus of the continuous type comprising a generator, a condenser, an evaporator, an absorber and conduits between these parts, a throttle between said condenser and said evaporator, a second throttle between said absorber and said generator, both throttles serving to maintain a given difference in pressure between the generator and condenser on the one hand and the evaporator and absorber on the other hand, the volume of said generator and the quantity of the absorption solution contained therein being sufficiently in excess of the volume of the absorber, the evaporator and the appertaining supply conduits, so that in case the absorber, the evaporator and the supply conduits should become completely filled with the absorption solution, enough solution still remains in the generator to prevent a dangerous temperature rise of the heating surface, the conduit connecting said absorber with said evaporator extending with an inverted curve into said evaporator and terminating in the lower portion thereof to only drain the leanest portion of the refrigerant from the evaporator, the highest point of said curved conduit being connected with the evaporator space above the refrigerant level to maintain automatically a given overflow level of the evaporator, the conduit connecting said condenser with said evaporator terminating in the upper portion of the evaporator.

KURT NESSELMANN.
ERNST SPRENGEL.